Patented Dec. 18, 1951

2,579,426

UNITED STATES PATENT OFFICE

2,579,426

ALLYL AMINE CARBONATES, POLYMERS, AND COPOLYMERS

Clyde E. Gleim, Akron, Ohio, assignor to Wingfoot Corporation, Akron, Ohio, a corporation of Delaware No Drawing. Application July 26, 1947,
Serial No. 764,023

6 Claims. (Cl. 260—77.5)

This invention relates to products resulting from the reaction of hydroxylamine with an allyl haloformate to form substituted hydroxylamines and to the polymers and copolymers thereof.

A new monomer has been discovered which may be polymerized to a resinous mass having desirable properties including being hard, clear, glass-like, infusible and insoluble. The method of preparing the novel monomers of this invention may be set forth in the following general equation where hydroxylamine is reacted with an ethyl haloformate:

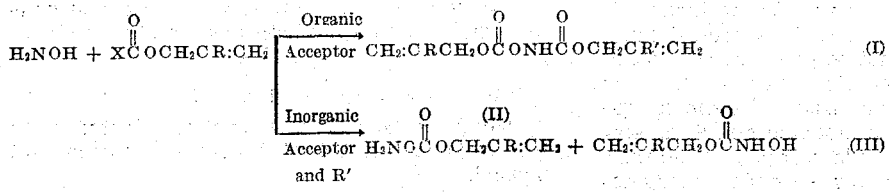

where X is halogen and R and R' are hydrogen or a halo or methyl radical. When the reaction is carried out in the presence of a hydrogen halide acceptor of the organic type, for example pyridine, the reaction between hydroxylamine and the haloformate takes place on both the amine hydrogen and the hydroxyl hydrogen as shown in the general equation at (I) to produce an amine linked ester carbonate which may be referred to as N-(carballyloxy)-O-(carballyloxy) hydroxylamine.

When the foregoing reaction is carried out in the presence of a hydrogen halide acceptor of the inorganic type, for example, an aqueous solution of sodium carbonate or potassium carbonate or a suspension of sodium carbonate or potassium carbonate in ether, the primary reaction takes place on the amine hydrogen to form an allyl ester of the hydroxylamine as shown in the general equation at (III) which ester may be identified as N-(carballyloxy) hydroxylamine. In addition to the allyl ester of hydroxylamine, traces of O-(carballyloxy) hydroxylamine are also formed, as shown at (II).

The substituted hydroxylamine formed in the presence of pyridine readily polymerizes to a clear, transparent, infusible, insoluble, glass-like resin when heated in the presence of an oxygen catalyst, but the products obtained when using the inorganic acceptor, as for example sodium carbonate, do not polymerize to a similar resin when using an oxygen catalyst. However, when the ester hydroxylamine is further reacted with an allyl haloformate, a substituted hydroxylamine of the type produced when using pyridine is obtained.

The following example is a specific embodiment of the above general equation. One mol part of hydroxylamine prepared from the reaction of hydroxylamine hydrochloride with sodium methylate was reacted with one mol part of allyl chloroformate in the presence of two mol parts of pyridine at a temperature of $-5°$ C. to $-20°$ C. until the reaction was complete. The reaction mixture was diluted in water and the oily layer recovered, washed, dried and distilled to give a 50% yield of N-(carballyloxy)-O-(carballyloxy) hydroxylamine, B. P. 140–143° C./5 mm., $n_D^{27.5}$ 1.4558, $d_{15}^{26.5}$ 1.1635. A small quantity of this substituted hydroxylamine was heated at 55° C. in the presence of 5% of benzoyl peroxide to form a clear, transparent, infusible and insoluble glass-like resinous mass having a Rockwell hardness of M 105.

The following is another example of the above general equation. One mol part of hydroxylamine was reacted with two mol parts of allyl chloroformate in the presence of five mol parts of pyridine at a temperature of $-5°$ C. to $-20°$ C. until the reaction was complete. The reaction mixture was poured into an excess of cold dilute hydrochloric acid solution and the oily layer recovered, washed with 2% sodium bicarbonate solution, dried over anhydrous sodium sulfate, and the low boiling heads removed under reduced pressure, to give a good yield of N-(carballyloxy) - O - (carballyloxy) hydroxyamine, $n_D^{32}$ 1.4582. A small quantity of this ester was heated with 5% benzoyl peroxide at 55° to form a clear, infusible and insoluble glass-like resin having a Rockwell hardness of M 75.

Another specific embodiment of the foregoing general equation involved reacting one mol part of the hydrochloride of hydroxylamine with two mol parts of allyl chloroformate in the presence of a suspension of sodium carbonate in ether at a temperature of about −5° C. to +30° C. to produce in good yield N(carballyloxy) hydroxylamine, having the formula $$CH_2{:}CHCH_2O\overset{O}{\overset{\|}{C}}NHOH$$

The N(carballyloxy) hydroxylamine was then reacted in equal molecular proportions with allyl chloroformate in the presence of pyridine to produce N-(carballyloxy)-O-(carballyloxy) hydroxylamine.

The following is another example of the above general equation. 69.5 parts of the hydrochloride of hydroxylamine was reacted at +10° C. to +30° C. with 241 parts of allyl chloroformate in the presence of 2.50 mol parts of sodium carbonate dissolved in 18.5 mol parts of water to give 198 parts of oily product which contained N(carballyloxy) hydroxylamine.

The reaction of hydroxylamine with the haloformate may be carried out at a temperature of between about −5° C. and about −20° C. It is preferred to carry out the reaction in the presence of a hydrogen chloride acceptor and particularly an acceptor of the organic type, as for example pyridine, since the desirable ester amino carbonate is then produced directly in one step. In addition to pyridine, piperidine and dimethyl aniline may be used as an acceptor.

The substituted hydroxylamines of this invention show exceptional ability to polymerize to a resinous mass having outstanding properties. These properties include a Rockwell hardness of M 100 or more, a specific gravity of 1.2 or more, in addition to being transparent and glasslike in appearance. These substituted hydroxylamines are particularly useful as cross-linking agents when added to and polymerized with other copolymerizable monomeric compositions and particularly when polymerized with the monofunctional polymerizable monomers such as styrene, acrylic acid, the acrylates, and acrylonitrile. The conjugated dienes, for example butadiene-1,3, the vinyl compounds including vinyl chloride, and vinylidene chloride may also be used.

The following is an example of the preparation of a cross-linked vinyl chloride copolymer. Two parts by weight of N-(carballyloxy)-O-(carballyloxy) hydroxylamine was mixed with 18 parts by weight of vinyl chloride and the homogeneous mixture was heated at 40° C. in the presence of 0.6 part by weight of benzoyl peroxide for 72 hours to give a cross-linked copolymer which was insoluble in ketones and ethylene dichloride.

The polymerization of the substituted hydroxylamines of this invention may be carried out at a temperature ranging from about 20° C. to about 100° C. for a period of time of about 10 hours to about 100 hours, depending upon the temperatures used and the presence or absence of a polymerization catalyst. It is preferred to use a polymerization catalyst and those found suitable are benzoyl peroxide, hydrogen peroxide, potassium perborate and other oxygen generating agents. The catalyst may be used in an amount between about 1% and about 10% based upon the total weight of the monomers being reacted. When the substituted hydroxylamines are copolymerized, the reaction is usually carried out under the same conditions as are used in carrying out the polymerization of these ester amino carbonates or under the conditions that are ordinarily employed in carrying out the polymerization of the polymerizable monomer being reacted with these substituted hydroxylamines.

The polymeric masses produced in accordance with the foregoing description are useful in the molding of any of the many types of articles ordinarily made from hard, clear, resinous masses.

Suitable changes may be made in the details of the process without departing from the spirit or scope of the present invention, the limitations of which are defined in the appended claims.

I claim:

1. An unsaturated nitrogen-containing compound derived from hydroxylamine having the general formula XONHX in which X is hydrogen by replacing at least one hydrogen indicated by X with a radical of the general formula $$CH_2{:}CRCH_2O\overset{O}{\overset{\|}{C}}-$$

wherein R is a radical selected from the group consisting of hydrogen, halogen and methyl.

2. N-(carballyloxy) hydroxylamine having the formula $$CH_2{:}CRCH_2O\overset{O}{\overset{\|}{C}}NHOH$$

3. A polymer of an unsaturated nitrogen-containing compound having the general formula $$CH_2{:}CRCH_2O-\overset{O}{\overset{\|}{C}}-ONH\overset{O}{\overset{\|}{C}}-OCH_2CR'{:}CH_2$$

in which R and R' is a radical selected from the group consisting of hydrogen, halogen and methyl.

4. A polymer of $$CH_2{:}CHCH_2O\overset{O}{\overset{\|}{C}}ONH\overset{O}{\overset{\|}{C}}OCH_2CH{:}CH_2$$

5. O-(carballyloxy) hydroxylamine having the formula $$CH_2{:}CHCH_2O\overset{O}{\overset{\|}{C}}ONH_2$$

6. N-(carballyloxy)-O-(carballyloxy) hydroxylamine having the formula $$CH_2{:}CHCH_2O\overset{O}{\overset{\|}{C}}NHO\overset{O}{\overset{\|}{C}}OCH_2CH{:}CH_2$$

CLYDE E. GLEIM.

REFERENCES CITED

The following references are of record in the file of this patent:

UNITED STATES PATENTS

| Number | Name | Date |
|---|---|---|
| 2,390,551 | Muskat et al. | Dec. 11, 1945 |